United States Patent [19]

Hoffa

[11] Patent Number: 5,199,328
[45] Date of Patent: Apr. 6, 1993

[54] MULTIPLE BLADE SET STRIP APPARATUS FOR CABLE AND WIRE

[75] Inventor: Jack L. Hoffa, Brea, Calif.

[73] Assignee: Eubanks Engineering Company, Monrovia, Calif.

[21] Appl. No.: 783,498

[22] Filed: Oct. 28, 1991

Related U.S. Application Data

[62] Division of Ser. No. 611,057, Nov. 9, 1990, Pat. No. 5,146,673.

[51] Int. Cl.$^5$ .............................................. H02G 1/12
[52] U.S. Cl. ........................................ 81/9.51; 81/9.42
[58] Field of Search ................... 29/825, 564.4, 33 M, 29/755; 81/9.51, 9.41, 9.42, 9.4

[56] References Cited

U.S. PATENT DOCUMENTS

| | | |
|---|---|---|
| 1,433,320 | 10/1922 | Wersel . |
| 1,477,678 | 12/1923 | Wetmore . |
| 2,523,936 | 9/1950 | Axelsen . |
| 2,645,959 | 7/1953 | Fuchs et al. . |
| 2,671,363 | 3/1954 | Wells . |
| 2,722,145 | 11/1955 | Schulenburg . |
| 2,765,685 | 10/1956 | Stratman et al. . |
| 2,811,063 | 10/1957 | Eubanks . |
| 2,880,635 | 4/1959 | Harris . |
| 2,934,982 | 5/1960 | Eubanks . |
| 3,176,550 | 4/1965 | Marcotte . |
| 3,222,957 | 12/1965 | Kramer et al. . |
| 3,292,462 | 12/1966 | Turecek et al. . |
| 3,309,948 | 3/1967 | Falken .................. 81/9.51 |
| 3,368,428 | 2/1968 | Gudmestad ............ 81/9.51 |
| 3,376,627 | 4/1968 | Sitz . |
| 3,479,718 | 11/1969 | Van De Kerkhof et al. . |
| 3,552,449 | 1/1971 | Woodward . |
| 3,570,100 | 3/1971 | Kindell et al. . |
| 3,614,905 | 10/1971 | Bieganski . |
| 3,645,156 | 2/1972 | Meyer et al. .......... 81/9.51 |
| 3,653,412 | 4/1972 | Gudmestad . |
| 3,701,301 | 10/1972 | Gudmestad . |
| 3,769,681 | 11/1973 | Eubanks . |
| 3,838,612 | 10/1974 | Inami . |
| 3,857,306 | 12/1974 | Gudmestad . |
| 3,857,313 | 12/1974 | Endo . |
| 3,869,781 | 3/1975 | Eubanks et al. . |

(List continued on next page.)

FOREIGN PATENT DOCUMENTS

| | | |
|---|---|---|
| 2927235 | 8/1980 | Fed. Rep. of Germany . |
| 2513478 | 9/1981 | France . |
| 2525403 | 4/1982 | France . |
| 1216815 | 3/1986 | U.S.S.R. .................. 81/9.51 |

OTHER PUBLICATIONS

French Patent Application 2,525,402 dated Apr. 16, 1982.

Primary Examiner—Roscoe V. Parker
Attorney, Agent, or Firm—William W. Haefliger

[57] ABSTRACT

The method of processing wire to cut the wire into sections and to strip sheathing from the wire to expose wire ends at opposite ends of the sections, and by operation of wire feed mechanism and cutter blades, the steps that include operating the feed mechanism and cutter blades to displace the wire endwise along an axis to a first position; sever the wire thereby to form wire forward and rearward sections, the forward section having a rearward end portion; and, the rearward section having a forward end portion, and; stripping sheathing from the forward section rearward portion and from the rearward section forward portion thereby to expose wire ends at the portions; the cutter blades including three blade pairs, each pair including two blades located at opposite sides of the axis, both blades of one pair being displaced toward the wire to sever the wire, and both blades of the remaining two pairs being displaced toward the wire sections to strip sheathing from the rearward and forward portions during controlled endwise displacement of the sections.

23 Claims, 7 Drawing Sheets

U.S. PATENT DOCUMENTS

| | | |
|---|---|---|
| 3,872,584 | 3/1975 | Chick et al. |
| 3,881,374 | 5/1975 | Gudmestad |
| 3,918,330 | 11/1975 | Blaha |
| 3,921,472 | 11/1975 | Gudmestad et al. |
| 3,927,590 | 12/1975 | Gudmestad et al. |
| 4,009,738 | 3/1977 | Baba et al. |
| 4,027,557 | 6/1977 | Stepan |
| 4,091,695 | 5/1978 | Funcik et al. |
| 4,112,791 | 9/1978 | Wiener |
| 4,156,961 | 6/1979 | Agoh |
| 4,164,808 | 8/1979 | Gudmestad et al. |
| 4,165,768 | 8/1979 | Gudmestad |
| 4,166,315 | 9/1979 | Gudmestad et al. |
| 4,175,316 | 11/1979 | Gudmestad |
| 4,194,281 | 3/1980 | Gudmestad |
| 4,238,981 | 12/1980 | Karl |
| 4,244,101 | 1/1981 | Talley |
| 4,261,230 | 4/1981 | Siindelar |
| 4,266,455 | 5/1981 | Ago |
| 4,275,619 | 6/1981 | Shimizu |
| 4,327,609 | 5/1982 | Resch |
| 4,350,061 | 9/1982 | Isham et al. |
| 4,364,289 | 12/1982 | Sorensen |
| 4,370,786 | 2/1983 | Butler |
| 4,403,383 | 9/1983 | Dewhurst et al. |
| 4,428,114 | 1/1984 | Teagno |
| 4,446,615 | 5/1984 | Talley |
| 4,493,233 | 1/1985 | Dusel et al. |
| 4,502,586 | 3/1985 | Dusel et al. |
| 4,521,946 | 6/1985 | Dusel et al. |
| 4,543,717 | 10/1985 | Luka |
| 4,581,796 | 4/1986 | Fukuda et al. |
| 4,584,912 | 4/1986 | Gudmestad et al. |
| 4,597,179 | 7/1986 | Goforth |
| 4,601,093 | 7/1986 | Cope |
| 4,631,822 | 12/1986 | Reinertz |
| 4,638,558 | 1/1987 | Eaton |
| 4,738,019 | 4/1988 | Kawaguchi |
| 4,745,828 | 5/1988 | Stepan |
| 4,802,512 | 2/1989 | Kodera |
| 4,827,592 | 5/1989 | Kodera |
| 4,833,778 | 5/1989 | Loustau |
| 4,838,129 | 6/1989 | Cope |
| 4,869,135 | 9/1989 | Hoffa |
| 4,932,110 | 6/1990 | Tanaka |
| 5,016,347 | 5/1991 | Okazaki et al. |

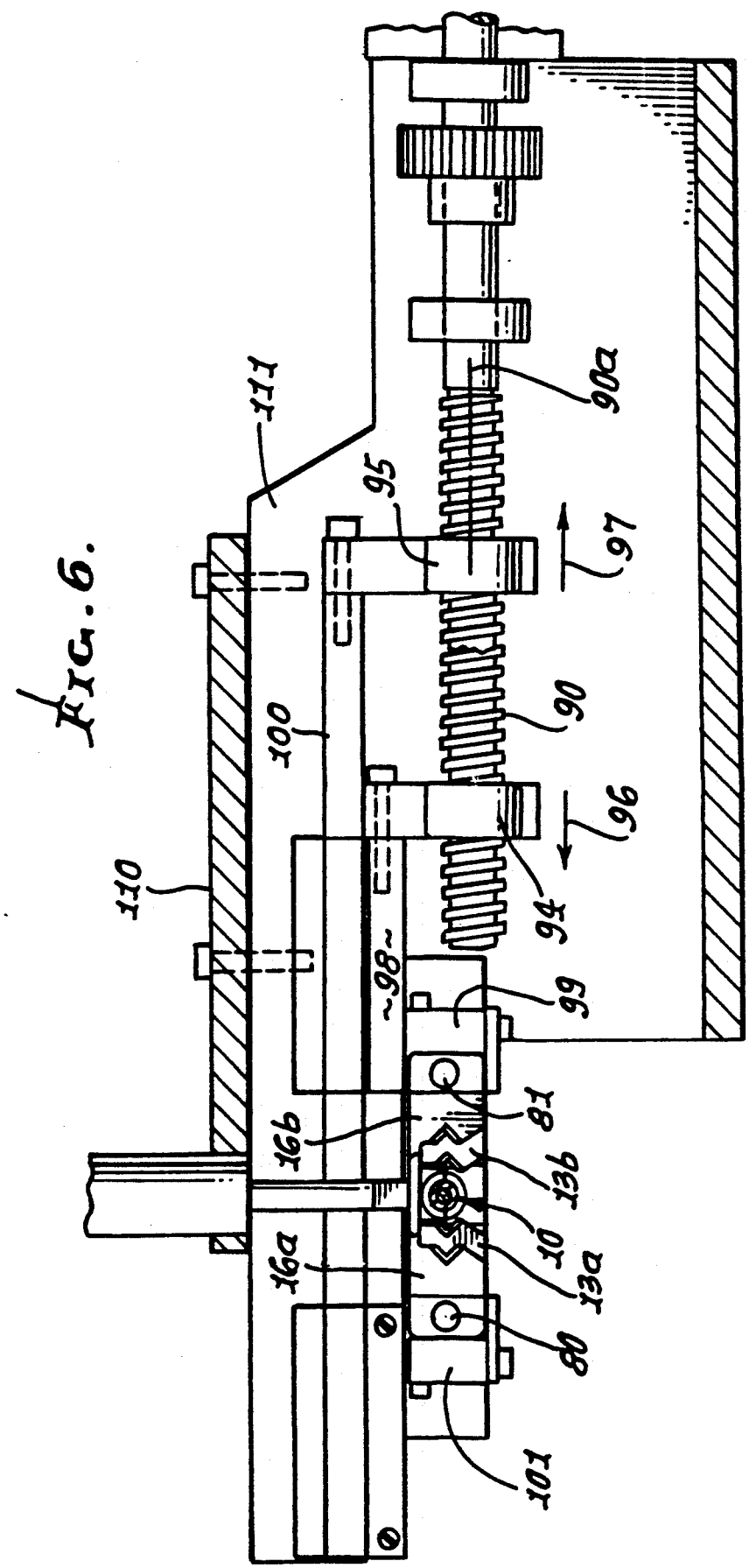

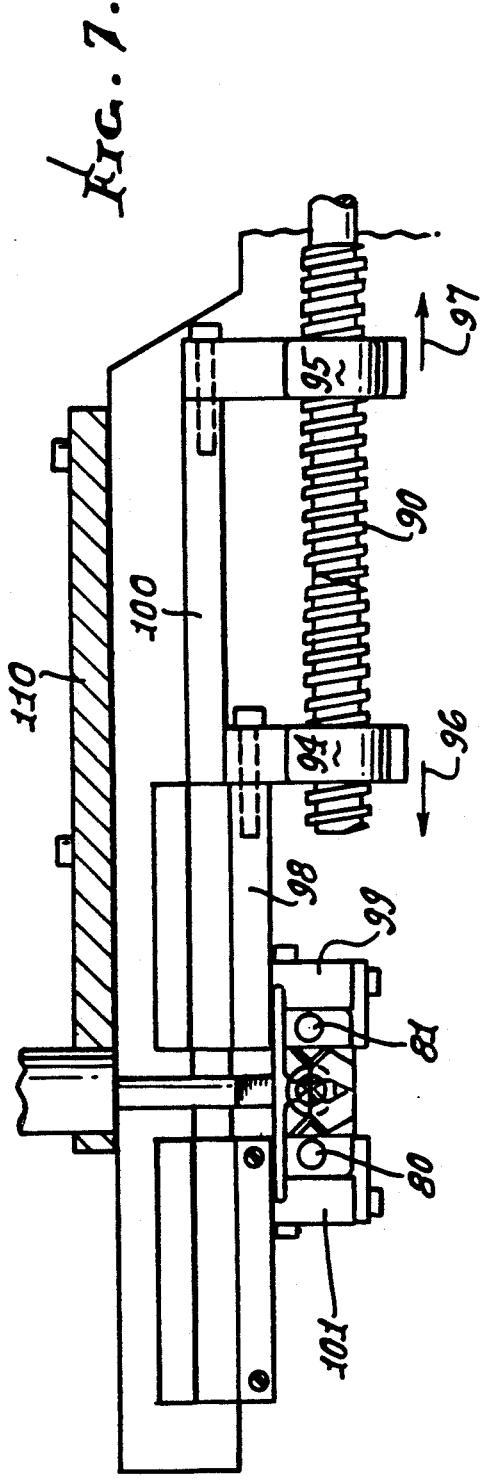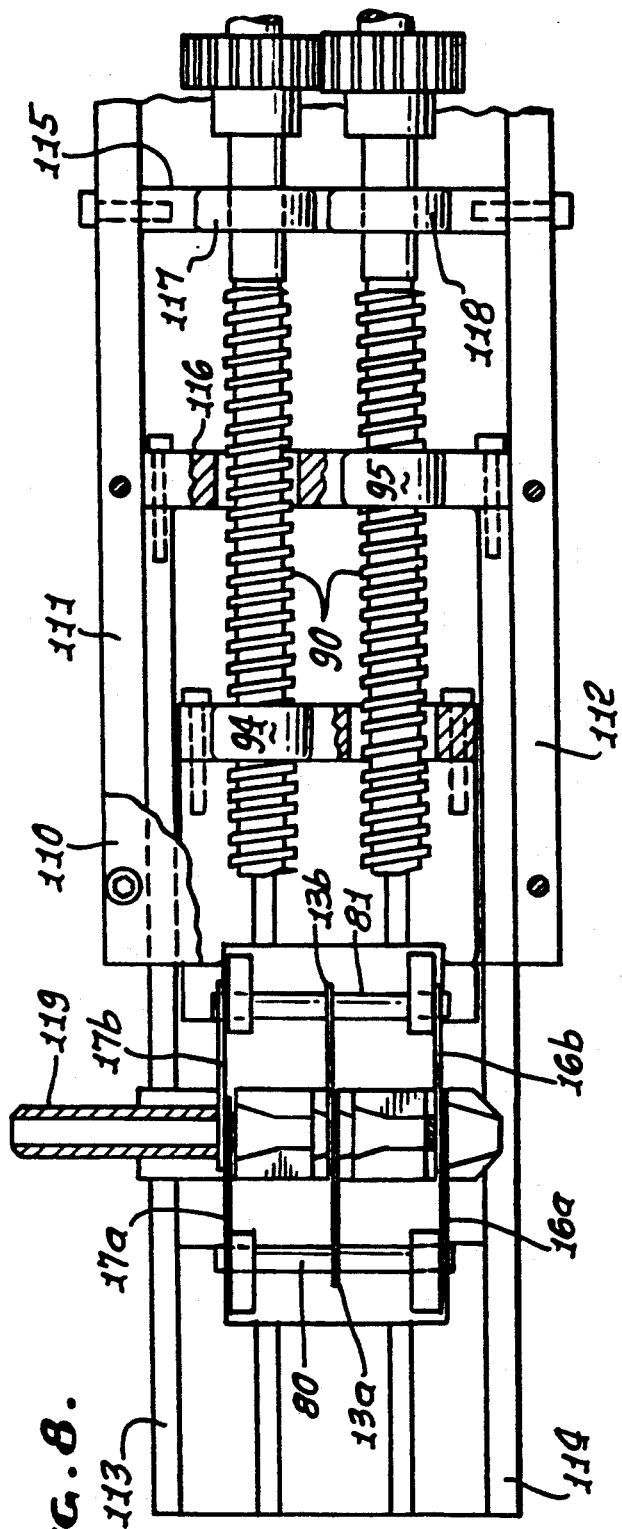

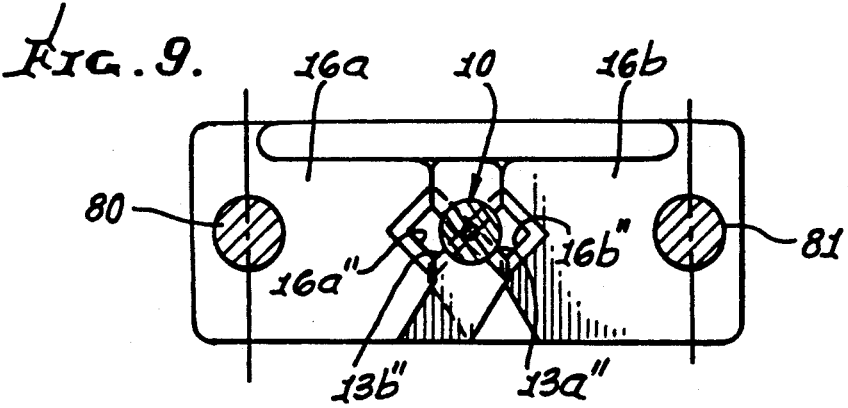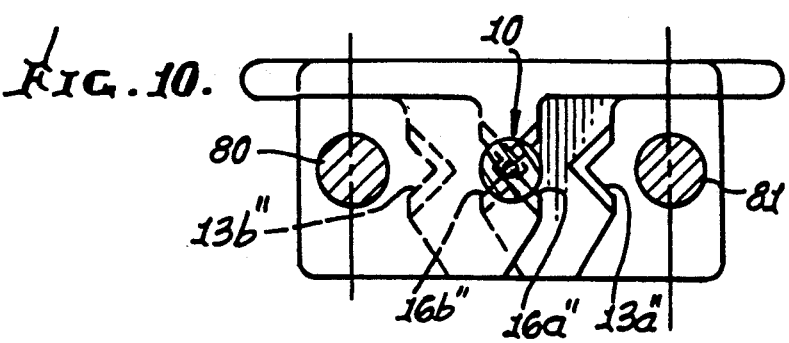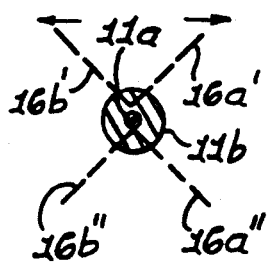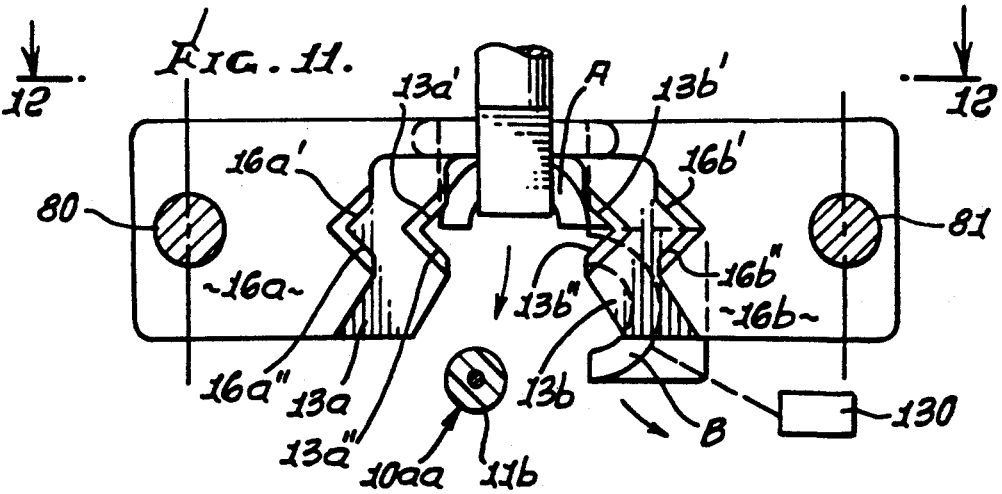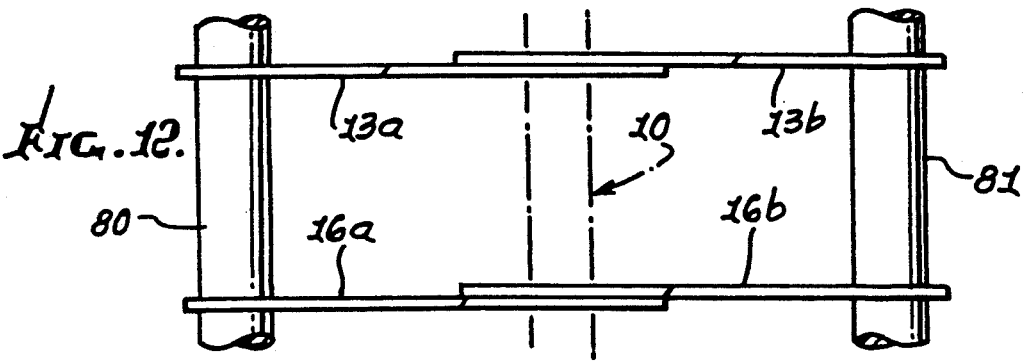

MULTIPLE BLADE SET STRIP APPARATUS FOR CABLE AND WIRE

This is a continuation of application Ser. No. 611,057 filed Nov. 9, 1990, and now U.S. Pat. No. 5,146,673.

BACKGROUND OF THE INVENTION

This invention relates generally to wire or cable severing, as well as stripping sheathing from severed wire sections; and more particularly, it concerns unusual advantages, method and apparatus to effect severing of a wire or cable into two sections, and stripping of sheathing off ends of both sections, with minimal motions of severing and stripping elements and in minimum time.

There is continual need for equipment capable of severing wire or cable into sections, and also capable of rapidly and efficiently stripping sheathing off ends of those sections. It is desirable that these functions be carried out as a wire or cable travels along generally the same axis, i.e., progresses forwardly, and that multiple wire and cable sections of selected length be produced, each having its opposite ends stripped of sheathing, to expose bare metal core wire at each end. Further, it is desirable that simple, radial and axial stripping adjustments be achieved upon multiple wire sections.

SUMMARY OF THE INVENTION

It is a major object of the invention to provide apparatus and method meeting the above need. The word "wire" will be used to include cable within its scope, and vice versa.

Basically, the method involves processing the wire into sections as by displacing the wire endwise along an axis to a first position; severing the wire thereby to form wire forward and rearward sections, the forward section having a rearward end portion, and the rearward section having a forward end portion; and stripping sheathing from the forward section rearward portion and from the rearward section forward portion thereby to expose wire cores at those end portions.

In this regard, the cutter means typically may include three blade pairs, each pair including two blades located at opposite sides of the axis, both blades of one pair being displaced toward the wire to sever the wire, and both blades of the remaining two pairs being displaced toward the wire sections to strip sheathing from the rearward and forward portions during controlled endwise displacement of the sections. Both blades of one pair are typically displaced into overlapping relation to sever the wire, and both blades of each of the remaining two pairs are displaced to cut only into opposite sides of the sheathing and to strip sheathing from the end portions of the sections as the sections are displaced endwise simultaneously.

Another object is to displace the two sections endwise, thereby to displace wire incorporating one of the sections to the first position. The method further includes the step of separating the sections axially relatively endwise after the step of severing of the wire and prior to the step of stripping of sheathing from the section end portions. In addition, the method may include the step of further separating the sections axially relatively endwise after the blades of the remaining two pairs have been displaced toward the wire sections to cut into the sheathing, thereby to pull sheathing slugs off the wire end portions to expose the wire end cores.

Yet another object is to guide displacement of the wire endwise along the axis, at locations between blade pairs; and in this regard, both of the forward and rearward sections may be so guided.

A further object is to carry out separation of the forward and rearward wire sections by advancing one section and retracting the other section, relative to the one blade pair; and the method typically involves carrying out further separation of the sections by further advancing the one section and further retracting the other section, relative to each one blade pair.

Apparatus for processing wire into sections, as referred to, and to strip sheathing from the sections to expose wire core ends, basically includes:

a) conveyor means for displacing the wire, including the sections, axially endwise, b) first cutter means including multiple blades located for movement toward the axis, and a first drive means for controllably displacing the multiple cutter blades toward the axis to sever the wire, c) second and third cutter means each including multiple blades located for movement toward the axis, and additional drive means for controllably displacing the multiple blades of the second and third cutter means toward the axis to cut into the sheathing, the second and third cutter means respectively located at axially opposite sides of the first cutter means and axially spaced therefrom, d) and drive means to controllably drive the conveyor means to i) position the wire to be severed by the first cutter means, thereby to produce forward and rearward wire sections, ii) relatively displace the sections axially, into positions to enable penetration of the second and third cutter mean blades into the sheathing, for subsequent stripping of sheathing from a rearward portion of the forward section and from a forward portion of the rearward section, as during controlled endwise displacement of the sections by the conveyor means.

Forward and rearward pairs of endless conveyors are typically employed, each pair of conveyors defining a wire gripping zone, such zones maintained in alignment with the wire sections during separation of the latter. Means is further provided to maintain one conveyor of each pair laterally displaced relatively toward the other conveyor of the pair to clamp the wire sections between the conveyors of the pairs during the further separation of the wire sections, and operating the conveyor pairs in endless relation to effect the relative separation in a longitudinal direction.

As will also be seen, the blades of the first cutter means typically have positions of relative overlap to sever the wire, in response to operation of the first drive means; and the blades of the second and third cutter means typically have positions of penetration only into the sheathing of the section end portions and to such depths as to enable stripping of the sheathing end portions in response to the controllable driving of the conveyor means.

In addition, novel and unusually effective apparatus is provided to advance the three sets of blades simultaneously toward the wire to first sever, and subsequently strip wire sheathing, at multiple axial locations, wire sections being axially displaced while severing blades are closed, and prior to closure of sheath stripping blades toward the sections.

These and other objects and advantages of the invention, as well as the details of an illustrative embodiment, will be more fully understood from the following specification and drawings, in which:

DRAWING DESCRIPTION

FIG. 6 is an enlarged cross-section taken in elevation to show sheathing stripping actuator structure;

FIG. 7 is a view like FIG. 6 but showing the blades in advanced positions;

FIG. 8 is a plan view of the FIG. 6 and FIG. 7 mechanism;

FIG. 9 is an end view showing wire severing blades in wire severing position, as in FIG. 1b;

FIG. 10 is an end view like FIG. 9 showing the sheathing stripping blades, in sheathing stripping position, as per FIG. 1d;

FIG. 10a is a view showing stripping blade edge penetration into wire sheathing;

Figure 1A:
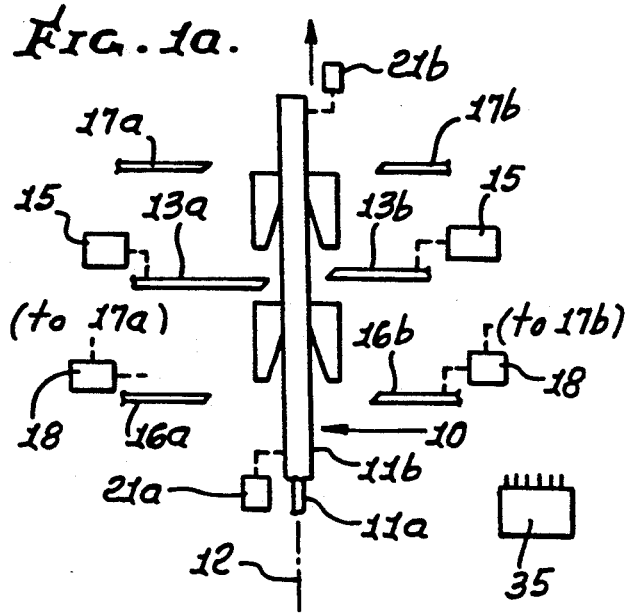
FIGS. 1a-1f are diagrammatic views showing steps in the methods of wire or cable processing.
Figure 1D:
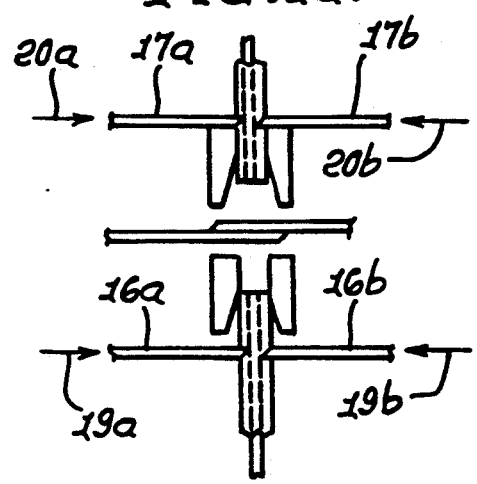
Figure 1B:
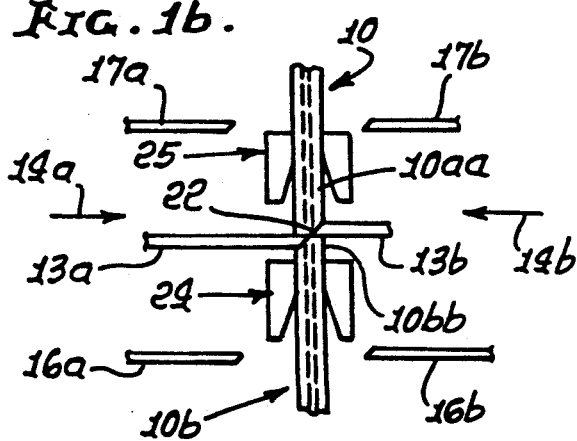
Figure 1E:
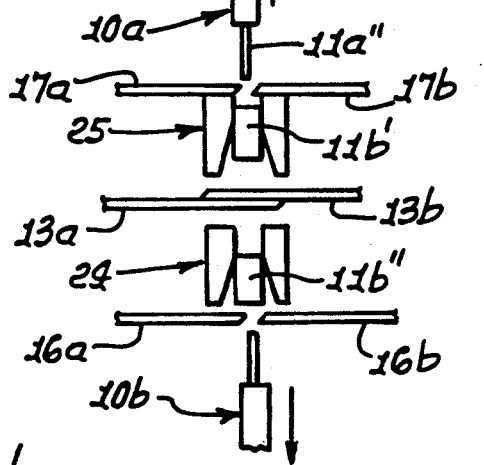
Figure 1C:
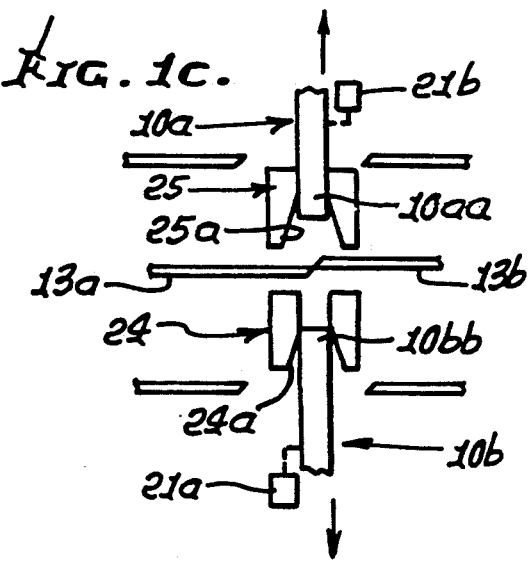
Figure 1F:
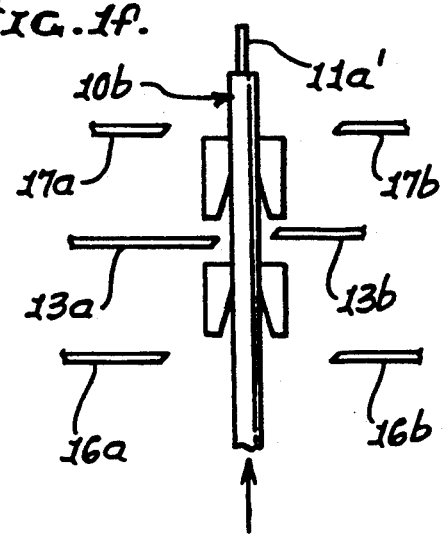

FIG. 11 is a view like FIGS. 9 and 11, but showing all blades in retracted position, as in FIGS. 1a and 1f; and FIG. 12 is an end view taken on lines 12—12 of FIG. 11.

DETAILED DESCRIPTION

Referring first to FIGS. 1a-1f, they show in diagrammatic form the positions of both wire severing and sheathing stripping blades, during various steps in the wire processing procedure or method. In this regard the "wire" 10 (meant to also refer to cable) has a metal core 11a and a tubular sheathing 11b about the core. The wire is shown extending axially longitudinally in FIGS. 1a-1f, the axis being located at 12.

First cutter means is provided to include, or may be considered to include, multiple blades. See for example the two wire-cutting blades 13a and 13b of a first set, located or carried for movement laterally toward and away from the wire axis 12. A first drive for controllably simultaneously enabling or advancing the blades toward one another, laterally oppositely (see arrows 14a and 14b in FIG. 1b), is shown at 15. That drive is also operable to retract the blades 13a and 13b away from one another.

Second and third cutter means are also provided, for sheathing stripping, and each may be considered to include multiple blades located for movement toward and away from the axis 12. See for example the second set of two blades 16a and 16b, and the third set of two blades 17a and 17b.

Blades 16a and 16b are located or considered to be controllably simultaneously displaced, as by drive 18, laterally oppositely, toward one another (see arrows 19a and 19b in FIG. 1d), the drive also operable to retract the blades 16a and 16b away from one another. Similarly, the blades 17a and 17b are located or carried to be controllably displaced, simultaneously, laterally oppositely toward one another (see arrows 20a and 20b in FIG. 1d), and drive 18 may be used for this purpose.

Thus, blades 16a and 16b may be displaced toward one another at the same time and to the same extent as blades 17a and 17b are displaced toward another, as is clear from FIG. 1d. The latter shows that the blades 16a and 16b, and 17a and 17b, do not sever the wire but may closely approach the wire while cutting into sheathing 11 for stripping purposes.

Brief reference to FIGS. 9-11 show the blades 16a and 16b to have V-shape, as do wire severing blades 13a and 13b, and blades 17a and 17b. Note edges 16a' and 16a" and 16b' and 16b" (of blades 16a and 16b) cutting into the sheathing in FIG. 10a to approach the wire core from four sides for efficient stripping, while leaving the core uncut. Similar functioning of blade edges 17a' and 17a", and 17b' and 17b" also takes place, as in FIG. 1d.

FIG. 1a shows displacement of the wire axially endwise and longitudinally, as by a conveyor means 21a to the first position as shown. FIG. 1b shows the step of severing the wire thereby to form wire forward and rearward sections 10a and 10b, the blades 13a and 13b being advanced laterally to accomplish complete severing at locus 22, as shown. Note that wire forward section 10a has a rearward end portion 10aa; and the wire rearward section 10b has a forward end portion 10bb.

FIG. 1c shows the step of controllably separating the two sections 10a and 10b axially endwise oppositely, as to the positions shown, in which the end portions 10aa and 10bb are spaced from the closed-together blades 13a and 13b. Guides 24 and 25, provided between the blade sets, serve to accurately guide the wire and the sections 10a and 10b during the cutting and severing operation, as is clear from FIGS. 1a-1f. Note the tapered entrances 24a and 25a to the guides to receive and center the forwardly advanced wire.

Wire drives 21a and 21b are controllably operated to engage and separate the two sections 10a and 10b, as indicated in FIGS. 1a and 1c.

FIG. 1d shows a sub-step included within the step of stripping sheathing from the forward section rearward portion and from the rearward section forward portion thereby to expose wire ends at the portions. Note that blades 16a and 16b are simultaneously advanced laterally oppositely, as to blade edge positions described above as respects FIG. 10a, and as blades 17a and 17b are also simultaneously advanced laterally oppositely (as to the same extent if such stripping is to be equal for each wire section). Note that blades 13a and 13b now extend in laterally overlapping condition due to operation of drives 15 and 18 as one, i.e., equal rightward lateral displacement for blades 13a, 16a and 17a, and equal leftward lateral displacement for blades 13a, 16b and 17b; however, they may be separately driven so as not to extend in such relation, as shown. Blades 13a, 16a and 17a may be connected together to move rightwardly to equal extent; and blades 13b, 16b and 17b may also be connected together to move leftwardly as one, for extreme simplicity.

FIG. 1e shows operation of the wire drives to further endwise separate the wire sections 10a and 10b so as to pull or strip two sheathing end portions 11b' and 11b" from the wire sections 10a and 10b, thereby to expose the wire core end portions 11a' and 11a" The stripped sheathing end portions 11b' and 11b", or slugs, are allowed to drop out from between the pairs of guides 24 and 25 which may be split, as shown, to provide slug drop-out openings, and may be movable to facilitate such drop out.

FIG. 1f shows all blades laterally retracted and the wire rearward section 10b fully advanced into position corresponding to FIG. 1a position for controlled length endwise positioning to be processed, as in FIGS. 1b-1e to provide an exposed core end at its opposite end. Thus, controlled length wires (or cables), with exposed core lengths at each end of each wire, is efficiently and rapidly and controllably provided. See master control 35 to control all the driving, as described, and to be described.

Referring now to FIGS. 2-8, one form of apparatus to accomplish the above operations (FIGS. 1a-1f) is shown in detail. A frame is provided, as at 40-44 and 44a, to mount two conveyors 45 and 46, which may be considered as included within the wire drives 30 and 31, as mentioned. Such conveyors may include two rearwardly positioned endless belts 47 and 48, and two forwardly positioned endless belts 49 and 50. The belts provide stretches, as at 47' and 48', which are adapted to sidewise flatly grip the wire 10 (and specifically the wire rearward section 10b) for endwise advancement and retraction, as during separation of the sections 10a and 10b in FIG. 1c; and stretches 49' and 50' are adapted to sidewise grip the wire 10 (and specifically the wire forward section 10a) for endwise advancement an retraction.

Figure 4:
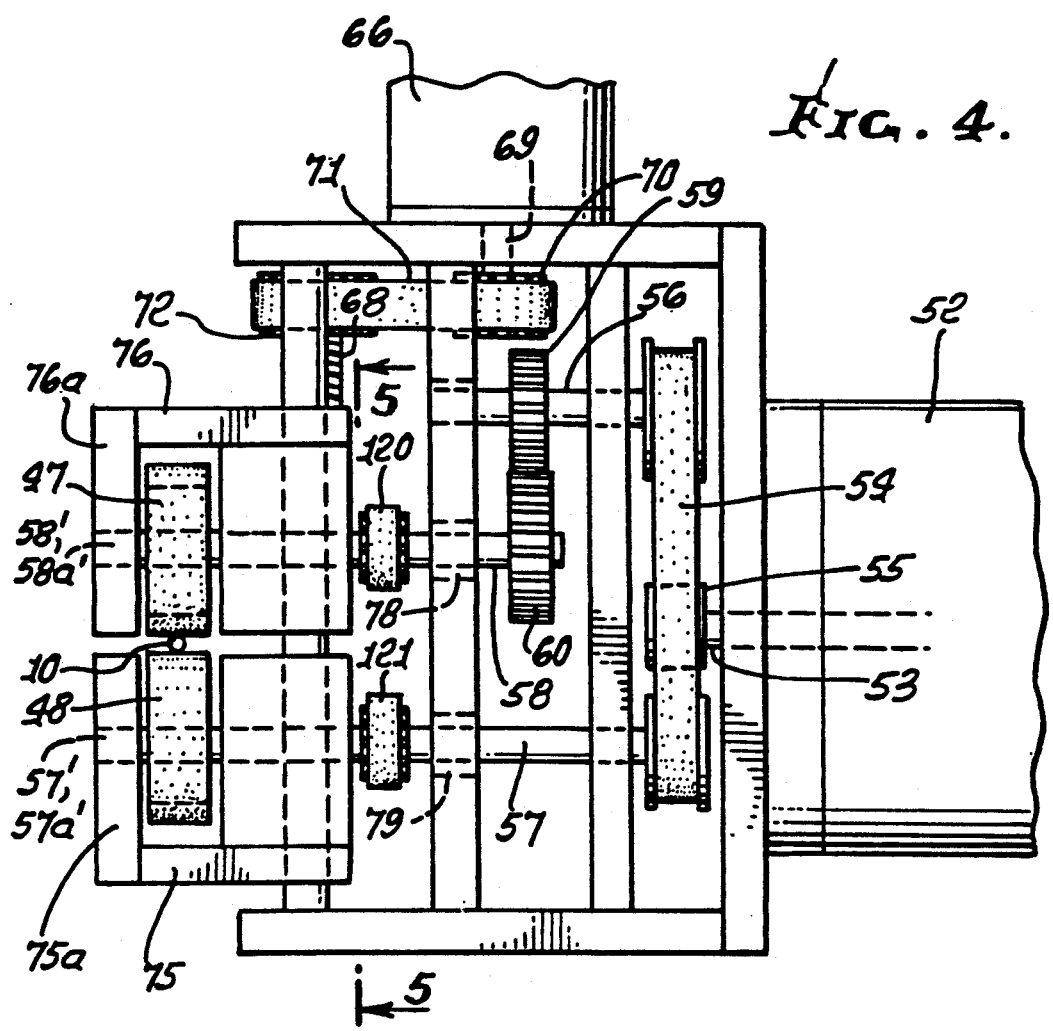
FIG. 4 is an end view, taken in elevation, showing wire belt displacing drive apparatus.

The belts 47 and 48 are driven to advance or retract the wire section 10a as from a drive motor 52 (see FIG. 4). The output shaft 53 of the motor drives belt 54, as via a pulley 55, and belt 54 drives shafts 56 and 57. Shaft 56 drives another shaft 58, through gearing 59 and 60, to drive shaft 58 and upper conveyor belt 47 clockwise; whereas lower shaft 57 and lower belt 48 are driven counterclockwise in FIG. 2. This drives the wire forwardly; whereas when motor 52 is reversed, the wire is driven rearwardly. Additional axles or shafts for the conveyor belts 47 and 48 appear at 58a and 57a.

Figure 2:
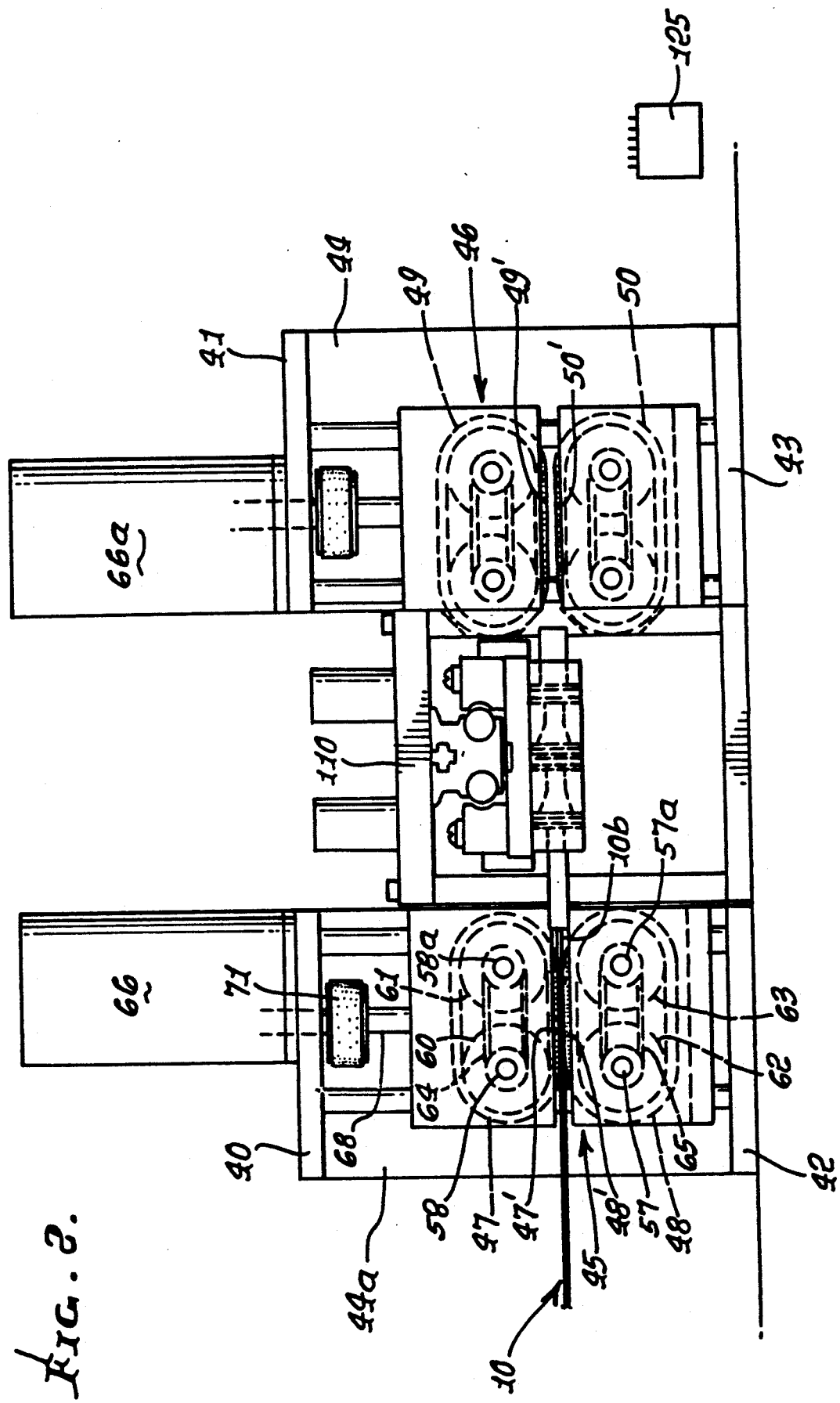
FIG. 2 is a side view elevation showing wire displacing and processing apparatus.

FIG. 2 shows conveyor rotors 60 and 61, and 62 and 63. These carry the belts 47 and 48. Axles 58a and 57a are driven by drive belts 64 and 65 extending between pulleys on the shafts 58 and 58a, and 57 and 57a, as shown. Accordingly, when the belt stretches 47' and 48' are closed against opposite sides of the wire 10, and the motor 52 is operating, the wire is displaced endwise.

Means is provided to move the conveyor belt stretches 47' and 48' toward one another to clutch the wire, and away from one another to de-clutch the wire. See for example in FIGS. 3-5 the motor or drive 66 carried by a frame part 67 to rotate a vertical screw shaft 68, as via motor output shaft 69, pulley 70, belt 71, and pulley 72 on the screw shaft 68. The screw shaft has screw thread engagement at 33 and 34 with frame members 75 and 76. Frame member 76 supports the ends of shafts 58 and 58a, via member extension 76a, as at 58' and 58a'; whereas frame member 75 supports the ends of shafts 57 and 57a, via member extension 75a, as at 57' and 57a'. Screw threading interfit at 74 is oppositely "handed" relative to threading interfit at 73, so that when shaft 68 is rotated in one direction about its axis, the frame members 75 and 76 are displaced toward one another, whereby conveyor stretches 47' and 48' may clamp the wire; and when the shaft 68 is rotated in the opposite direction about its axis, the members 75 and 76 are displaced away from each other, and the wire is de-clutched.

The bearing supports at 80 and 81 for shafts 58 and 57 are made loose enough to accommodate such up/down movement of those shafts at the conveyor belt drive locations. Note also couplings at 110 and 111.

Tension springs 90 and 91 are provided (see FIG. 5) between fixed frame structure 9 and shoulders 76a' on 76a to yieldably urge the structures 76 and 76a, and the belt stretch 47' downwardly; and similarly, tension springs 93 and 94 are provided between fixed frame structure 95 and shoulder 75a' on 75 to yieldably urge the structure 75 and 75a and the belt stretch 48' upwardly. This provides clearance "take-up" for better control of wire gripping or clamping.

Figure 3:
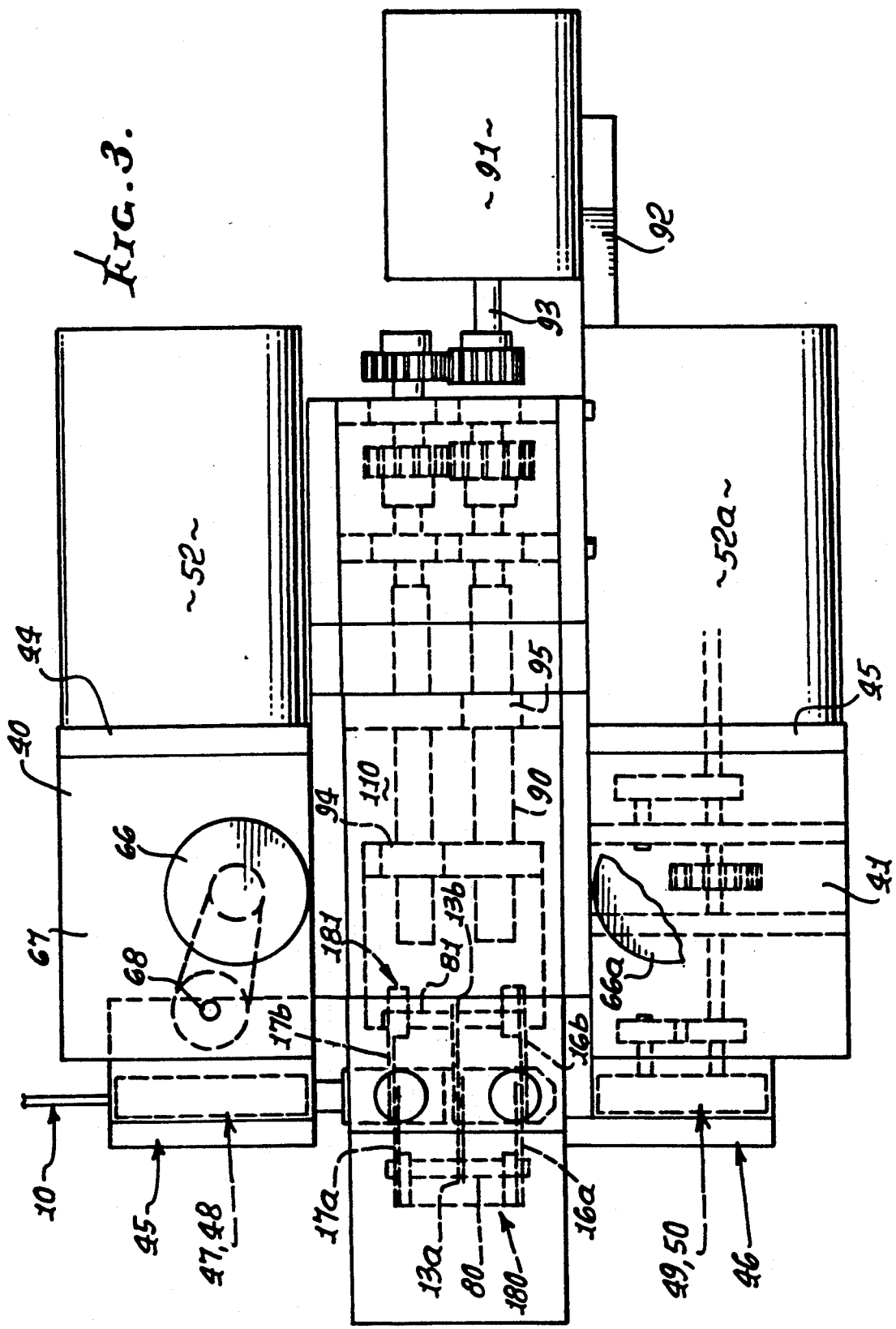
FIG. 3 is a top plan view showing the apparatus of FIG. 2.
Figure 5:
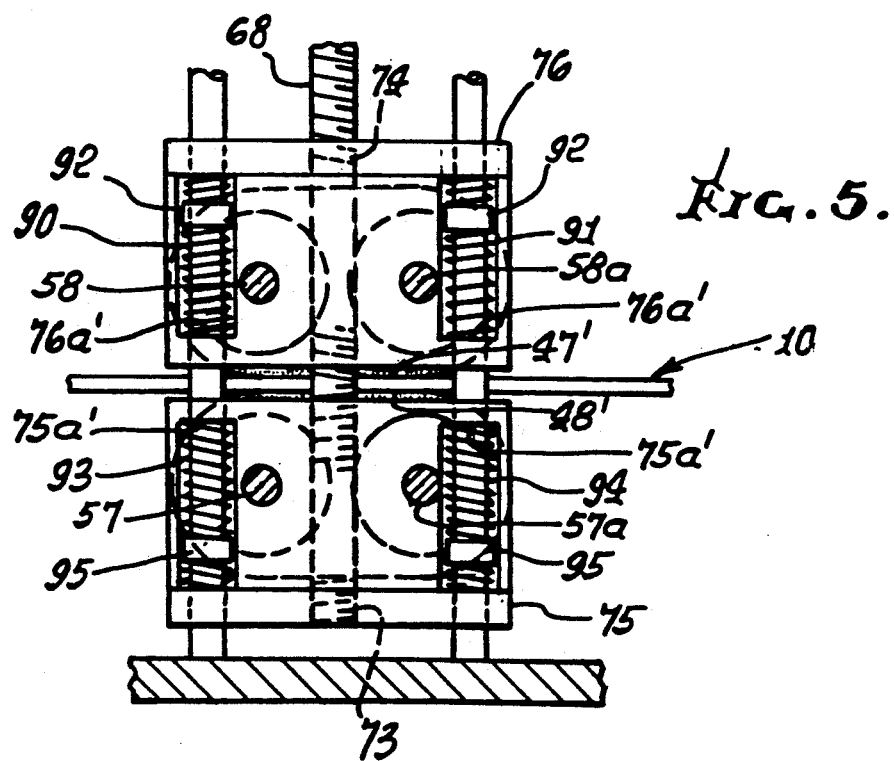
FIG. 5 is an elevation showing spring urging of wire drive belts.

The forward conveyor unit 46 embodies conveyor belt drive and up/down movement the same as described in connection with unit 45 in FIGS. 3-5. The drive motor 52a for driving the belt stretches 49' and 50' forwardly and reversely is seen in FIG. 3, as is the motor 66a to control belt clamping of the forward wire section. Mechanism between the motors 52a and 66a, and the respective forward conveyor belts 49 and 50 is the same as above described mechanism between motors 52 and 66 and the respective rearward conveyor belts 47 and 48; however, the motors 52 and 51a are typically operated simultaneously, either to drive the wire or wire sections forwardly, as in FIGS. 1a and 1f, or to drive the wire sections endwise oppositely, as in FIGS. 1c and 1e. A master control to control all drives, in a pre-programmed manner, is seen at 125.

Referring to FIG. 11, the wire severing blades 13a and 13b are fully laterally retracted, as are the wire sheathing stripping blades 16a and 16b. Blades 17a and 17b are in axial alignment with blades 16a and 16b, and are not shown. Note V-angled blade edges 13a' and 13a", and blade edges 13b' and 13b". The blades 13a, 16a and 17a at one side of the wire 10 are interconnected by axially extending carrier rod 80; and the blades 13b, 16b and 17b at the opposite ends of the wire are interconnected by axially extending carrier rod 81, laterally spaced from rod 80. Rods 80 and 81 are relatively movable laterally toward one another to effect wire severing, as by blades 13a and 13b (see FIG. 9 and also FIG. 1b). Rods 80 and 81 are further laterally movable toward one another to effect penetration of the blade edges 16a' and 16a", and 16b' and 16b" into the sheathing (as in FIGS. 10 and 10a), and as also seen in FIG. 1d. Thereafter, the wire forward and rearward sections 10a and 10b are separated as in FIG. 1e to endwise strip the slugs 10aa and 10bb, off the wire cores, as also seen in FIG. 11. Dropping of the slug is also seen in FIG. 11, as is lowering of a wire guide lower sector B of guide 24", to release the slug. The upper guide sector is shown at A. A drive 135 is operable to lower and raise sector B..

Means to effect the described lateral movement of the blade carrier rods 80 and 81 in shown in FIGS. 3, and 6-8. As seen, a laterally extending lead screw 90 is rotatable by a drive motor 91, carried by frame part 92. See connecting shaft 93. As screw 90 rotates in one direction about its axis 90a, nuts 94 and 95 on the screw threads travel axially oppositely (see arrows 96 and 97) to move rod 80 to the right and rod 81 to the left, as in FIGS. 9 and 10. See connectors 98 and 99 connecting nut 94 with rod 81, and connectors 100 and 101 connecting nut 95 with rod 80. A pair of parallel lead screws 90 may be utilized for these purposes, as see in FIG. 8, each driven by the motor 91, with one lead screw associated with blades 16a and 16b, and the other associated with blades 17a and 17b. Balanced force transmission to the two sets of blades is thereby effected. See also frame elements 110–116 supporting the structure, as indicated. Bearings appear at 117 and 118. An additional tubular wire guide is seen at 119.

I claim:

1. In apparatus for processing wire to cut the wire into sections and to strip sheathing from the sections to expose section wire ends, the combination comprising:
   a) conveyor means for displacing the wire, including said sections, axially endwise,
   b) first cutter means including multiple blades located for movement toward said axis, a first drive means for controllably displacing said multiple blades toward said axis to sever the wire,
   c) second and third cutter means each including multiple blades located for movement toward said axis, and additional drive means for controllably displacing said multiple blades of said second and third cutter means toward said axis to cut into said sheathing and to selected depths, said second and third cutter means respectively located at axially opposite sides of said first cutter means and axially spaced therefrom,
   d) and drive means to controllably drive said conveyor means to
      i) position the wire to be severed by said first cutter means, thereby to produce forward and rearward wire sections,
      ii) controllably relatively displace said sections axially, into positions to enable penetration of said second and third cutter means blades into said sheathing, for subsequent stripping of selected lengths of sheathing from a rearward portion of the forward section and from a forward portion of the rearward section, as during controlled endwise displacement of said sections by said conveyor means.

2. The combination of claim 1 wherein said blades of said first cutter means have positions of relative overlap to sever the wire, in response to operation of said first drive means.

3. The combination of claim 1 wherein said blades of said second and third cutter means have positions of penetration only into said sheathing of said section end portions to enable stripping of said sheathing end portions in response to said controllable driving of said conveyor means.

4. The combination of claim 1 wherein said conveyor means includes forward and rearward pairs of endless conveyors to respectively engage and displace the wire sections, while the blades of the first cutter means are closed in overlapping relation.

5. The combination of claim 4 including actuator means to maintain at least one conveyor of each pair displaced relatively toward the other conveyor of said pair, to clamp the wire section between the conveyors during further separation of the sections and during sheathing stripping.

6. The combination of claim 4 wherein said conveyor comprise endless belts and including a driver to controllably advance and retract said belts endlessly.

7. The combination of claim 5 wherein said actuator means includes a rotary screw, a drive to rotate the screw, and follower means to convert rotary motion of the screw into linear motion acting to displace the conveyor or conveyors, as aforesaid.

8. The combination of claim 1 wherein said blades of the first cutter means have V-shaped edges.

9. The combination of claim 8 wherein the blades of each of the second or third cutter means have V-shaped edges to cut into the sheathing, as aforesaid.

10. The combination of claim 8 wherein said edges of the first cutter means blades are closer to said axis than said edges of the second and third cutter means blades, as said blades approach said axis for wire severing and sheathing stripping.

11. The combination of claim 1 including wire guide means at a location between said first cutter means and at least one of said second and third cutter means for guiding said endwise displacement of at least one wire section at said location.

12. The combination of claim 11 wherein said wire guide means includes a movable part movable relative to said axis to allow removal of a severed length of said sheathing.

13. The combination of claim 12 including means operatively connected with said part for so moving said movable part relative to said axis.

14. In processing means for processing longitudinally axially extending wire that includes a core and protective structure extending about the core, the combination comprising
   a) first blade means for relative movement laterally to sever the wire,
   b) other blade means spaced axially from said first blade means for relative movement laterally to penetrate said wire structure to controlled depth,
   c) said first and other blade means being operatively interconnected and there being actuator means connected therewith and control means connected with said actuator means to move said first and other blade means laterally simultaneously to first sever the wire and to then penetrate said protective structure to said controlled depth,
   d) conveyor means for displacing the wire axially,
   e) drive means to controllably drive said conveyor means to
      i) position the wire to be severed by said first cutter means, thereby to produce forward and rearward wire sections,
      ii) controllably relatively displace said sections axially, into positions to enable penetration of said second and third cutter means blades into said protective structure, for subsequent stripping of selected lengths of said protective structure from a rearward portion of the forward section and from a forward portion of the rearward section, as during controlled endwise displacement of said sections by said conveyor means,
   f) and wire guide means to guide the wire as it moves axially proximate the blade means, and means to displace at least a part of said guide means to allow removal of a severed length of said protective structure, as the wire is moved axially relative to said blade means.

15. The combination of claim 14 wherein said wire has a longitudinal axis, said first blade means having a first cutting edge and said other blade means having another cutting edge, said cutting edges differentially spaced from said axis as said first and other blade means are simultaneously moved toward said axis prior to said severing of the wire.

16. The combination of claim 14 wherein said first blade means includes a first set of blades, and said other blade means includes second and third sets of blades.

17. The combination of claim 16 wherein said first set of blades is located axially between said second and third sets of blades.

18. The combination of claim 17 wherein said first set of blades is located axially midway between said second and third sets of blades.

19. The combination of claim 14 wherein said means to displace at least a part of the guide means includes a drive to lower and raise said part of the guide means to allow displacement of stripped wire slugs downwardly.

20. The combination of claim 14 wherein said other blade means includes second and third blade means, and said wire guide means includes wire guides between said first and second cutter means, and between said first and third cutter means, said guides including elements that remain in guiding position, and other elements movable out of guiding position to allow removal of severed length slugs of said structure from wire ends.

21. The combination of claim 20 including drive means operatively connected with said other elements to effect movement thereof into and out of wire guiding position.

22. The combination of claim 14 including conveyor means for displacing the wire axially relative to said first and other blade means, and drive means to controllably drive said conveyor means to position the wire to be severed into sections, and to have associated protective structures thereof penetrated to controlled depth, by said first and other blade means, respectively.

23. In apparatus for processing wire to cut the wire into sections and to remove sheathing from the sections to expose section wire ends, the combination comprising:

a) conveyor means for displacing the wire, including said sections, axially endwise,
b) first cutter means including multiple blades located for movement toward said axis, drive means for controllably displacing said multiple blades toward said axis to sever the wire,
c) second and third cutter means each including multiple blades located for movement toward said axis, said drive means for controllably displacing said multiple blades of said second and third cutter means toward said axis to cut into said sheathing, said second and third cutter means respectively located at axially opposite sides of said first cutter means and axially spaced therefrom,
d) and drive means to controllably drive said conveyor means to
 i) position the wire to be severed by said first cutter means, thereby to produce forward and rearward wire sections,
 ii) relatively displace said sections axially, into positions to enable penetration of said second and third cutter means blades into said sheathing, for subsequent removal of sheathing from a rearward portion of the forward section and from a forward portion of the rearward section, in association with controlled endwise displacement of said sections by said conveyor means,
e) and wire guide means to guide the wire as it moves axially proximate the blade means, and means to displace at least part of said guide means to allow removal of a severed length of said sheathing, the wire being moved axially relative to said blade means.

* * * * *

UNITED STATES PATENT AND TRADEMARK OFFICE
CERTIFICATE OF CORRECTION

PATENT NO. : 5,199,328

DATED : April 6, 1993

INVENTOR(S) : Jack L. Hoffa

It is certified that error appears in the above-identified patent and that said Letters Patent is hereby corrected as shown below:

Column 8, line 45; "said second and third cutter means blades into" should read --said other blade means into--

Signed and Sealed this

Thirteenth Day of September, 1994

Attest:

BRUCE LEHMAN

Attesting Officer

Commissioner of Patents and Trademarks

UNITED STATES PATENT AND TRADEMARK OFFICE
CERTIFICATE OF CORRECTION

| | | |
|---|---|---|
| PATENT NO. | : 5,199,328 | Page 1 of 1 |
| APPLICATION NO. | : 07/783498 | |
| DATED | : April 6, 1993 | |
| INVENTOR(S) | : Jack L. Hoffa | |

It is certified that error appears in the above-identified patent and that said Letters Patent is hereby corrected as shown below:

On Column 1, line 5, "This is a continuation of application Ser.No.611,057, filed Nov.9, 1990, and now U.S. Pat.No.5,146,673" should read --This is a division of application Ser.No.611,057, filed Nov. 9, 1990, and now U.S. Pat.No.5,146,673--.

Signed and Sealed this

Fourth Day of March, 2008

JON W. DUDAS
*Director of the United States Patent and Trademark Office*